(12) United States Patent
Arrant et al.

(10) Patent No.: US 7,715,541 B2
(45) Date of Patent: May 11, 2010

(54) METHODS, SYSTEMS, AND COMPUTER PROGRAM PRODUCTS FOR USING A PERSONAL CONFERENCE TO PRIVATELY ESTABLISH AND CONTROL MEDIA CONNECTIONS WITH A TELEPHONY DEVICE

(75) Inventors: Christopher Arrant, Garland, TX (US); Sunil Devireddy, Dallas, TX (US); Subash Madhusudan, Dallas, TX (US)

(73) Assignee: BroadSoft M6, LLC, Gaithersburg, MD (US)

( * ) Notice: Subject to any disclaimer, the term of this patent is extended or adjusted under 35 U.S.C. 154(b) by 1030 days.

(21) Appl. No.: 11/218,326

(22) Filed: Sep. 1, 2005

(65) Prior Publication Data

US 2007/0058795 A1    Mar. 15, 2007

(51) Int. Cl.
H04M 3/42    (2006.01)
H04Q 11/00   (2006.01)

(52) U.S. Cl. .................................. 379/202.01; 370/260
(58) Field of Classification Search .................. 370/260, 370/261, 263, 266, 268, 269
See application file for complete search history.

(56) References Cited

U.S. PATENT DOCUMENTS

| | | | |
|---|---|---|---|
| 5,373,549 A | 12/1994 | Bales et al. | |
| 5,379,280 A | 1/1995 | Cotton et al. | |
| 5,384,771 A | 1/1995 | Isidoro et al. | |
| 5,590,127 A | 12/1996 | Bales et al. | |
| 6,011,851 A * | 1/2000 | Connor et al. | 381/17 |
| 6,144,671 A * | 11/2000 | Perinpanathan et al. | 370/409 |
| 6,404,873 B1 * | 6/2002 | Beyda et al. | 379/202.01 |
| 2003/0088619 A1 * | 5/2003 | Boundy | 709/204 |
| 2004/0010549 A1 * | 1/2004 | Matus et al. | 709/204 |
| 2004/0028199 A1 | 2/2004 | Carlson | |
| 2004/0081293 A1 | 4/2004 | Brown et al. | |

(Continued)

FOREIGN PATENT DOCUMENTS

EP    0 744 857    8/2004

(Continued)

OTHER PUBLICATIONS

Notification of Transmittal of the International Search Report and the Written Opinion of the International Searching Authority, or the Declaration for International Application No. PCT/US06/33854 (Apr. 20, 2007).

(Continued)

*Primary Examiner*—William J Deane
(74) *Attorney, Agent, or Firm*—Jenkins, Wilson, Taylor & Hunt, P.A.

(57) ABSTRACT

Methods, systems, and computer program products for using a personal conference to privately establish and control media connections with a telephony device are disclosed. According to one method, a media connection is established between a first user and a personal conference instance. The first user is connected to the personal conference instance via a telephony device, such as a PSTN phone. A plurality of second media connections is established between a plurality of second users and the personal conference instance in a manner that conceals existence of the personal conference instance to at least one of the second users. Media packets from the second users are mixed and sent to the first user. Media packets from the first user are sent to the second users. The first user dynamically controls at least one aspect of the personal conference call instance.

44 Claims, 11 Drawing Sheets

U.S. PATENT DOCUMENTS

2006/0215584 A1* 9/2006 Yoshida ................. 370/260

OTHER PUBLICATIONS

"Bridge Talk User's Guide," *Avaya*, Document No. 81100300 Rev C, pp. 1-288 (Jul. 2005).

"Web Portal 3.2 User Guide," *Avaya*, Document No. 81100289, pp. 1-72 (Jun. 22, 2005).

"Avaya Audio Console User Guide," *Avaya*, Document No. 81100286 Rev A, pp. I-9-2 (2004).

Cisco MeetingPlace User Guide, Phone Setup Instructions, pp. 1-2 (Publication Date Unknown) (Copyright 2004).

"Cisco MeetingPlace Hosted Service," Data Sheet, Cisco Systems, Inc., pp. 1-9 (Publication Date Unknown) (Copyright 1992-2004).

"Cisco MeetingPlace 8106 Rich-Media Conferencing on Every Desktop," Data Sheet, Cisco Systems, Inc., pp. 1-6 (Publication Date Unknown) (Copyright 1992-2004).

"Cisco MeetingPlace 5.3," Data Sheet, Cisco Systems, Inc., pp. 1-16 (Publication Date Unknown) (Copyright 1992-2004).

"IP Centric Conferencing," A Radvision White Paper, Radvision, pp. 1-14 (Publication Date Unknown) (Copyright 2001).

Configuration Guide for Cisco MeetingPlace Audio Server Release 5.3, "Chapter 3: Configuring a Cisco MeetingPlace Shadow Server," OL-6456-01, Cisco Systems, Inc., pp. 3-1-3-16 (Publication Date Unknown).

Configuration Guide for Cisco MeetingPlace Audio Server Release 5.3, "Chapter 2: Setting Up Cisco MeetingPlace Audio Server," OL-5823-01, Cisco Systems, Inc., pp. 2-1-2-68 (Publication Date Unknown).

"Cisco Meeting Place Glossary," OL-6141-01, pp. GL1-GL20 Cisco Systems, Inc., (Publication Date Unknown).

* cited by examiner

METHODS, SYSTEMS, AND COMPUTER PROGRAM PRODUCTS FOR USING A PERSONAL CONFERENCE TO PRIVATELY ESTABLISH AND CONTROL MEDIA CONNECTIONS WITH A TELEPHONY DEVICE

TECHNICAL FIELD

The subject matter described herein relates to methods, systems, and computer program products for establishing and controlling a plurality of media streams to a telephony device. More particularly, the subject matter described herein relates to methods, systems, and computer program products for privately establishing and controlling media streams to a telephony device using a personal conference call.

BACKGROUND ART

In telephony networks, it may be desirable to provide a mechanism where more than two media streams can be privately mixed and sent to a general purpose PSTN telephony device. Conventional telephony devices, such as PSTN phones, are limited in that they can only handle two different incoming media streams. If it is desirable to send more than two media streams from a local PSTN phone to a remote PSTN phone or to receive more than two media streams from the remote PSTN phone, it is necessary to use a conference bridge. However, using a conference bridge requires that all parties connected to the conference bridge hear each other.

In some instances, it may be desirable for the local PSTN phone to receive more than two media streams without requiring that the mixed media streams be delivered to all users or devices connected to the local PSTN phone. For example, if a business manager is communicating with multiple employees in the field, it may be desirable for the manager to be able to simultaneously hear multiple employees in the field. However, it may not be necessary that the employees in the field know that the manager can hear all of them or that they be able to hear each other. In another example, one user may desire to listen to music while communicating with other users but may not desire to transmit the music to the other users. In yet another example it may be desirable for an administrator or supervisor at a call center to hear multiple calls with customers, to selectively adjust features of the calls, and to prevent the customers from hearing each other. Conventional conference bridges lack the flexibility to implement these scenarios.

FIG. 1 illustrates a conventional meet-me conference that uses a conference bridge, which mixes and sends audio packets from all parties to all parties. In FIG. 1, a conference host or moderator 100 informs users 102 of a DID number for a conference bridge 104. Each user 102 dials the DID number for conference bridge 104 and bidirectional media streams 106 are established between each user and conference bridge 104. In this example, each user hears the audio stream of every other user. Moderator 100 can adjust volume of a connection through floor control application software. Some floor control application software even allows the moderator to selectively mute participants in the conference call for privacy purposes. However, such systems still require that the users be aware of the conference call and that audio streams from users who are not muted be presented to all other users.

Accordingly, in light of these shortcomings, there exists a long felt need for methods, systems, and computer program products for privately establishing and controlling media connections with a PSTN telephony device.

SUMMARY

According to one aspect, the subject matter described herein includes a method for privately establishing and controlling media connections with a telephony device using a personal conference. The method includes establishing a media connection between a first user and a personal conference call instance. A plurality of second media connections is established between a plurality of second users and the personal conference instance. The first user is connected to the personal conference instance via a telephony device, such as a PSTN phone. The second media connections are established in a manner that conceals existence of the personal conference call instance from at least one of the second users. Media packets from the second users are mixed and delivered to the first user. Media packets from the first user are sent to the second users. The first user can dynamically control at least one feature of the personal conference call.

One advantage of using a personal conference call to privately establish and control media streams to a telephony device over using conventional conference calls is that the users other than the initiator may be unaware of each other. In addition, the initiator can selectively control features of the media streams that he or she hears. Exemplary features that can be controlled by the initiator include per line volume, muting, and directionality. Another advantage of using a personal conference call user to privately establish and control multiple media streams to a telephony device is that the telephony device is not required to have its own multi-line conferencing capabilities.

BRIEF DESCRIPTION OF THE DRAWINGS

Preferred embodiments of the subject matter described herein will now be explained with reference to the accompanying drawings of which.

DETAILED DESCRIPTION

Figure 1:
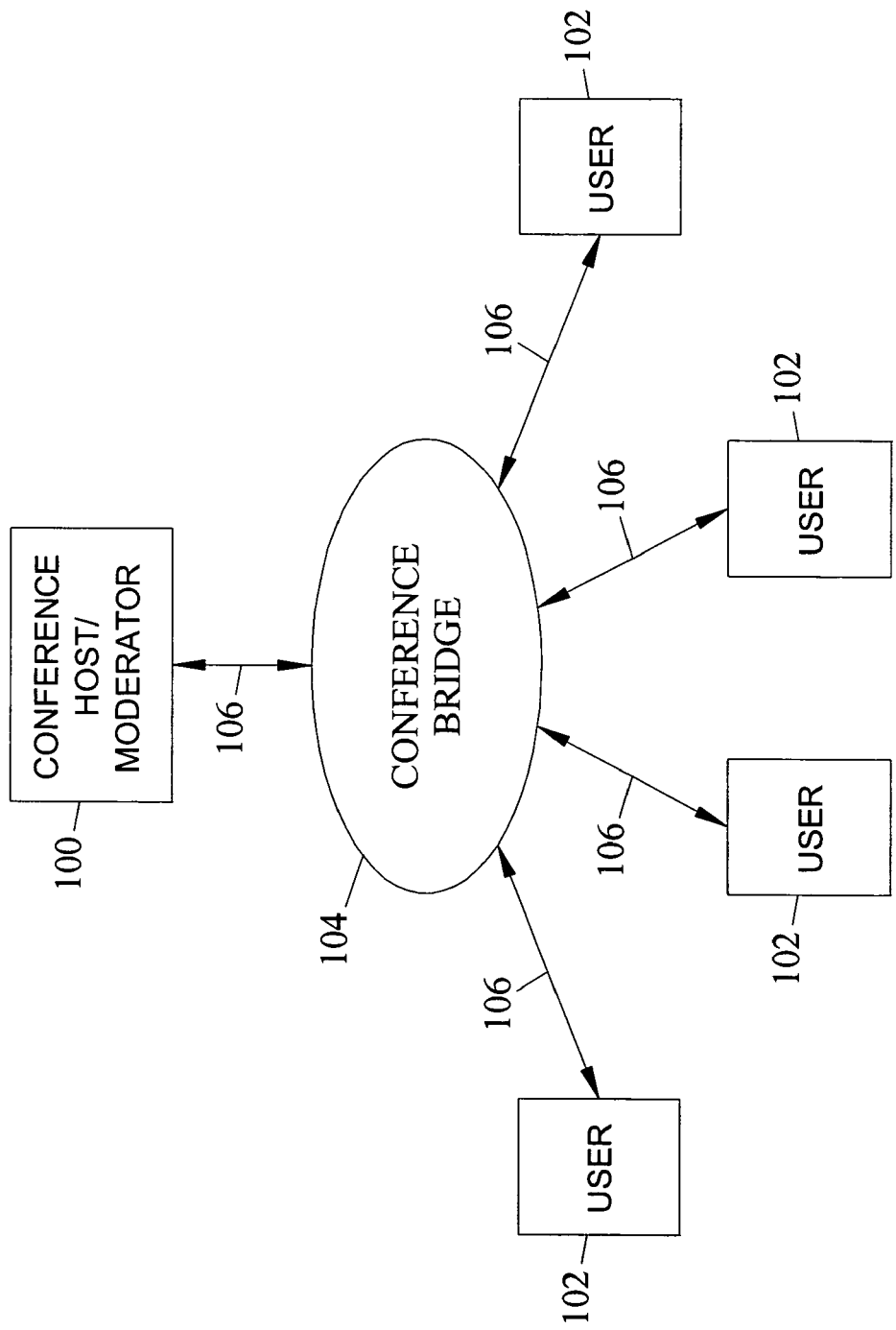
FIG. 1 is a schematic diagram of a conventional meet-me conference call.
Figure 2:
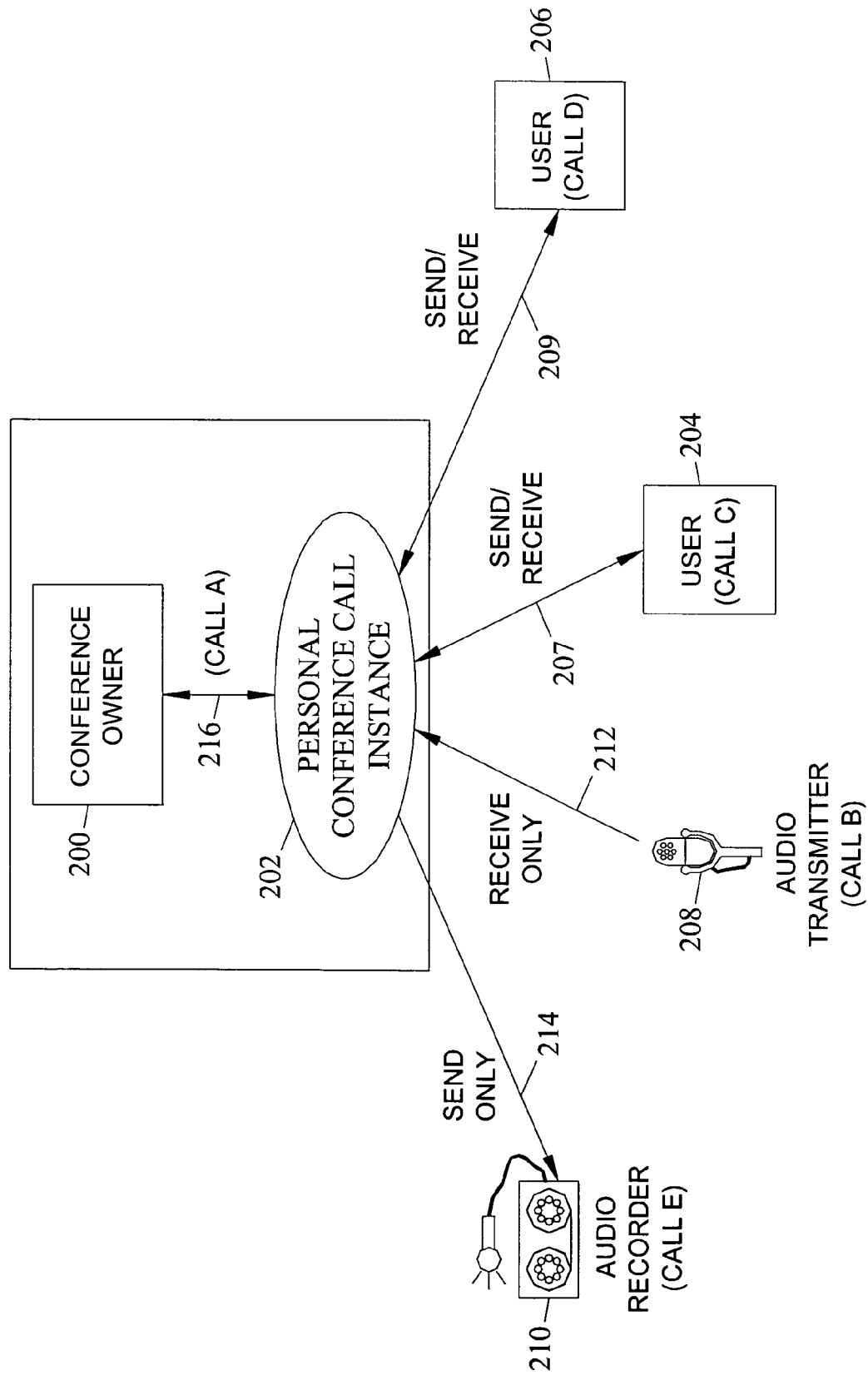
FIG. 2 is a schematic diagram illustrating the use of a personal conference for the private establishment and control of multiple media connections with a telephony device according to an embodiment of the subject matter described herein.

According to one aspect, the subject matter described herein includes a method for private establishment and control of multiple media connections to a telephony user using a personal conference call. The establishment and control of the connections is private because the connections are established and controlled in a manner that conceals the existence of the personal conference call from at least one user. FIG. 2 is a schematic diagram illustrating the use of a personal conference call to deliver multiple media streams to a telephony user according to an embodiment of the subject matter described herein. Referring to FIG. 2, a conference owner or initiator 200 initiates a connection with a personal conference call instance 202. Personal conference call instance 202 includes hardware and software for establishing media connections with user 204, user 206, audio transmitter 208, and audio recorder 210. According to an important aspect of the subject matter described herein, users 204 and 206 are preferably unaware that they are participating in a conference call. That is, media connections 207 and 209 are preferably established and controlled in such a manner to conceal the fact that users 204 and 206 are connected to personal conference call instance 202. Rather, users 204 and 206 may believe that they are connected directly to the phone of conference owner 200.

According to another aspect of the subject matter described herein, conference owner 200 may dynamically control one or more aspects of the personal conference. One aspect controllable by conference owner 200 may include directionality. For example, connections 207 and 209 may be send/receive so that users 204 and 206 can hear conference owner 200 and so that conference owner 200 can hear users 204 and 206. Connection 212 from audio transmitter 208 may be receive only. For example, audio transmitter 208 may generate music that conference owner 200 wishes to hear but does not wish to broadcast to other users. Connection 214 with audio recorder 210 may be send only so that audio recorder 210 receives media packets from conference owner 200 but not from other sources. Alternatively, audio recorder 210 may receive mixed packets from any one or more of the audio sources in the conference call where the packets being mixed are controlled by conference owner 200.

The directionality, volume, or other feature of any of the connections connected to personal conference instance 202 may be changed on the fly. Exemplary messages that may be used to dynamically control features of a personal conference call that is used to control multiple media connections with a telephony user will be described in detail below.

Although the diagram in FIG. 2 relates primarily to audio streams being delivered to and from the conference owner, the subject matter described herein is not limited to delivering only audio content. Any media type that can be packetized and sent over a network may be delivered to and from a conference owner using the methods described herein. For example, video streams from each non-owner user may be mixed and sent to the conference owner but not to other non-owners. Similarly, a video stream from the owner may be fanned out and distributed to each non-owner.

Table 1 shown below illustrates exemplary comparisons between a personal conference call used to privately deliver multiple media streams to a conference owner as illustrated in FIG. 2 and a traditional conference call.

TABLE 1

Personal Conference Call-Traditional Conference Call Comparison

| Personal Conference Call | Traditional Conference Call |
| --- | --- |
| Attached to specific user (owner) or device. | Not attached to a specific user, but is attached to multiple users or participants. |
| None of the end users including specific user are aware that they are in a conference, i.e., it's completely hidden from the user perspective. | Every end user is aware of his or her own and other user's presence in a conference call. |
| Audio streams are only added by an action from specific user. | Audio streams are added by an action from participant, such as dialing a conference number. |
| Audio streams from other users are presented only to the specific user. Other users hear audio from specific user only. | Audio streams from other users are presented to every other user. Users hear audio from each other. |
| Only a specific user can change the direction or volume of an audio stream. | Any participant who has the privileges as a moderator can adjust the volume or change the properties on a connection through floor control application software. |
| An audio stream connected to such conference is not a participant. | An audio stream connected to such conference is a participant. |

According to the first row of Table 1, one difference between a personal conference call and a traditional conference call is that a personal conference call is attached to a specific user or device, whereas a traditional conference call is not attached to a specific user. Instead, a traditional conference call is attached to multiple users who are also participants in the call. By "attached," it is meant that a user receives multiple audio streams. As illustrated in the second row of Table 1, another difference between a personal conference call and a traditional conference call is that in a personal conference call, none of the non-owner users are aware that they are in a conference call. In contrast, in a conventional conference, each user is aware of his or her presence and each additional user's presence in the conference call.

Although the second row of Table 1 illustrates that one aspect of a personal conference call may be that no users are aware of other users presence conference call, the subject matter described herein is not limited to call in which no users are aware of any other users. In an alternative implementation, some users may be aware of other users, as controlled by the conference owner.

As indicated in the third row of Table 1, another difference between a personal conference call and a traditional conference call is that in a personal conference call, audio streams are added only by action from a specific user. In a traditional conference, audio streams can be added by action from any participant who dials the conference number.

According to row four of Table 1, another difference between a personal conference call and a traditional conference call is that in a personal conference call, audio streams from other users are presented only to the conference owner, and in a traditional conference call, audio streams from non-owner users are presented to each non-owner user. Some traditional conferences allow selective muting of participants. However, in general, the goal of traditional conference calls is for users other than the initiator to be able to hear each other. In contrast, in a personal conference call, the goal is for the conference owner to hear non-owner users and for the non-owner users to hear the conference owner but not each other.

Although row four of Table 1 indicates that in a personal conference call, streams from other users are only presented to the conference owner, the subject matter described herein is not limited to such an embodiment. For example, audio streams from non-owner users may be presented to other non-owner users in a personal conference call where such presentation is selectively controlled by the conference owner.

As indicated in row five of Table 1, yet another difference between a personal conference call and a traditional conference call is that in a personal conference call, non-owner users hear audio only from the conference owner whereas in a traditional conference, non-owner users hear audio from each other.

Although row five in Table 1 indicates that in a personal conference call, non-owner users only hear audio from the conference owner, the subject matter described herein is not limited to such an implementation. For example, it an alternate implementation, the conference owner may selectively allow certain non-owner users to hear other non-owner users.

As indicated by row six of Table 1, yet another difference between a personal conference call and a traditional conference call is that in a personal conference call, only a conference owner can change the directionality and volume of an audio connection, whereas in a traditional conference, any participant who has moderator privileges can adjust the properties of a connection through floor control software. However, it should be noted that in a personal conference call, multiple users can control packets sent to them as owners without departing form the scope of the subject matter described herein.

Figure 3:
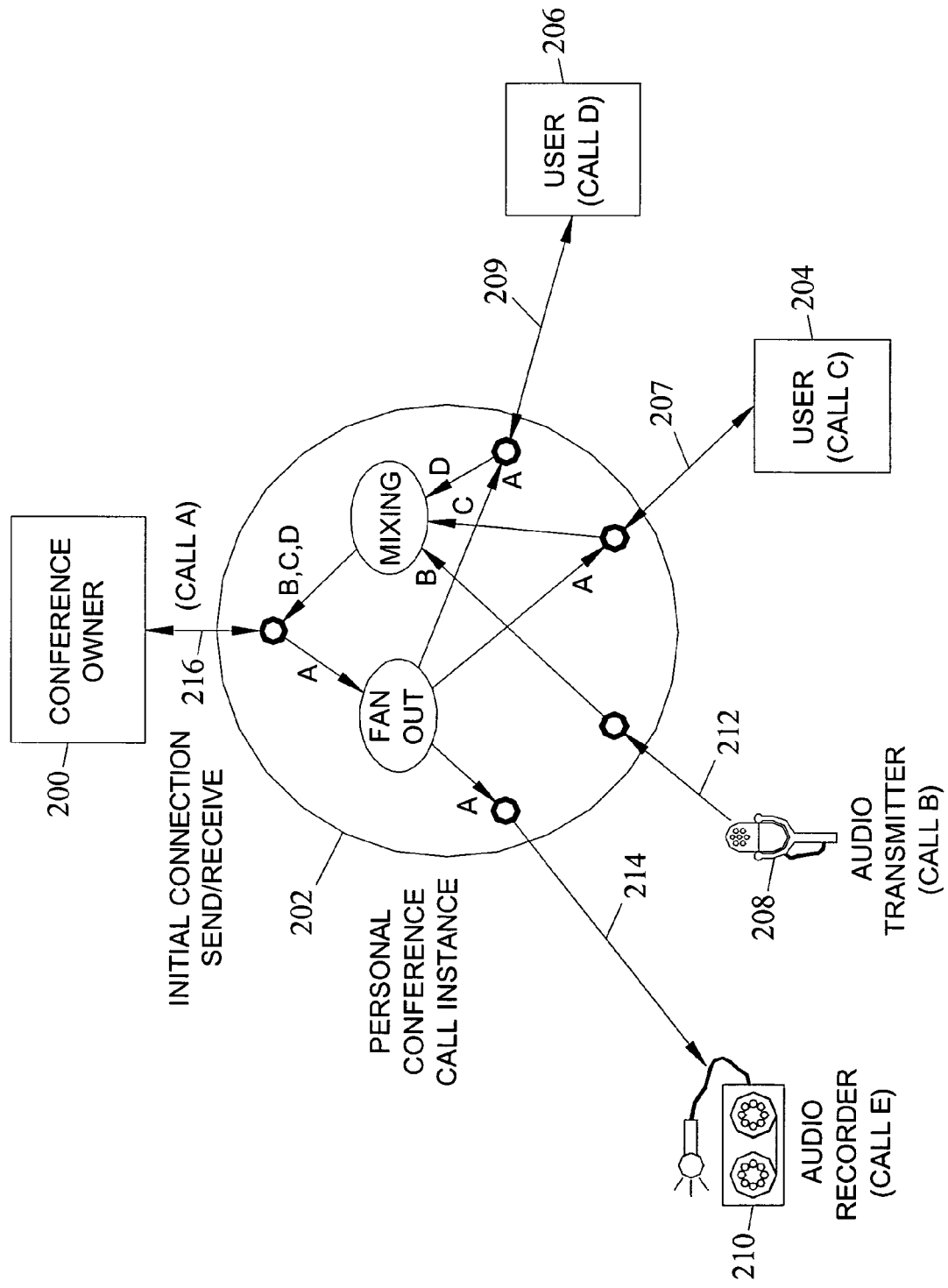
FIG. 3 is a schematic diagram illustrating the use of a personal conference for the private establishment and control of multiple media connections with a telephony device according to an embodiment of the subject matter described herein.

Still another difference between a personal conference call and a traditional conference call is that in a personal conference call, an audio stream connected to the conference call is not a participant, whereas an audio stream connected to a traditional conference is a participant. In this context, a participant is someone who receives multiple audio streams. FIG. 3 is a schematic diagram illustrating the use of the personal conference call instance illustrated in FIG. 2 in more detail. In particular, FIG. 3 shows that audio stream 216 delivered to conference owner 200 is a mixture of packets from audio connections 207, 209, and 212. However, the outbound sides of audio connections 207, 209, and 214 represent only a fanned out version of the outbound side of media stream 216. An exemplary algorithm for mixing media streams and controlling features of the personal conference call instance will be described in detail below.

Figure 4:
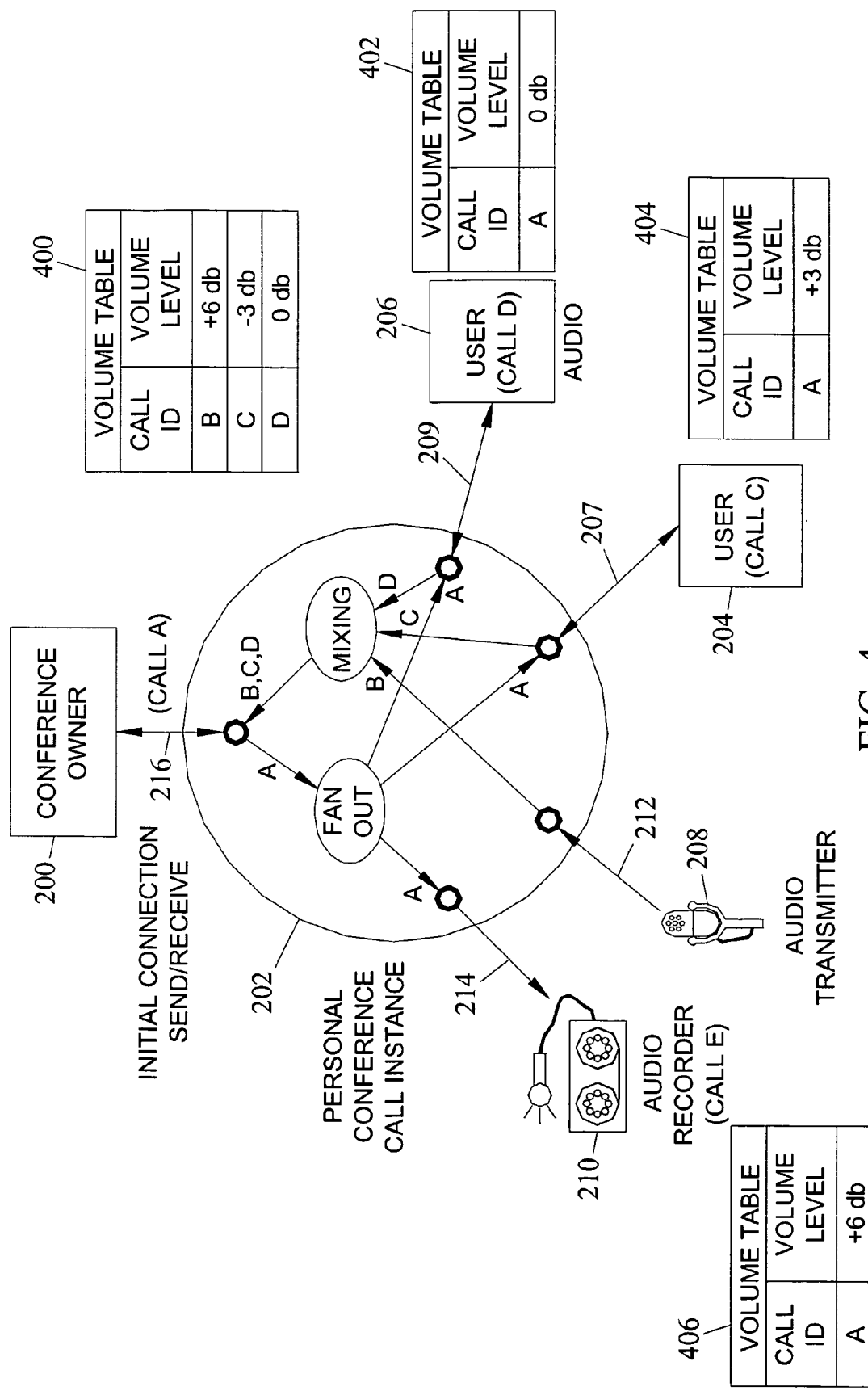
FIG. 4 is a schematic diagram illustrating a method using a personal conference to privately control volume levels for multiple media connections with a telephony device according to an embodiment of the subject matter described herein.

As described above, one aspect of the subject matter described herein is that the conference owner can selectively control the volume level of other users and the volume level of his or her own outbound media stream. FIG. 4 illustrates this concept. In FIG. 4, personal conference call instance 202 maintains a volume table 400 including data used by personal conference call instance 202 for adjusting volume levels for media packets received from users 204 and 206 and audio transmitter 208. Similarly, personal conference call instance 202 also maintains separate volume tables 402, 404, and 406 for individually adjusting the volume level of media packets delivered from conference owner 200 to users 204 and 206 and to audio transmitter 208.

Figure 5:
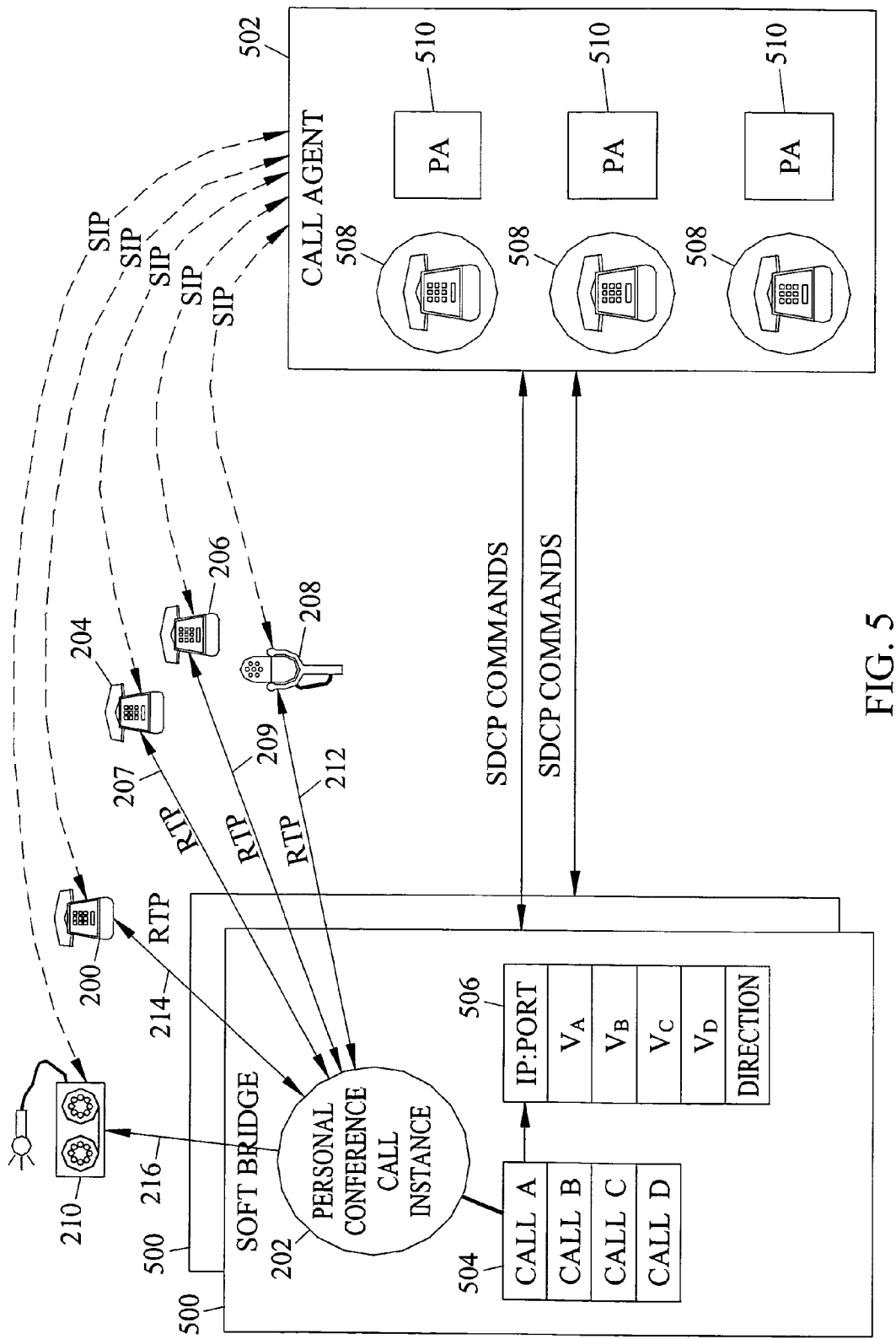
FIG. 5 is a block diagram illustrating an exemplary system for using a personal conference to establish and dynamically control media connections with a telephony device according to an embodiment of the subject described herein.

FIG. 5 is a block diagram illustrating an exemplary architecture for using a personal conference call to deliver and control multiple media streams in more detail. Referring to FIG. 5, a system for providing multiple media streams to a PSTN user using a personal conference may include a soft bridge 500 and a call agent 502. Soft bridge 500 is responsible for establishing, maintaining, and tearing down real time transmission protocol (RTP) media streams with conference owner 200, users 204 and 206, audio transmitter 208, and audio recorder 210. Call agent 502 is responsible for performing signaling functions to set up, maintain, and tear down media communications between conference owner 200, users 204 and 206, audio transmitter 208, audio recorder 210, and personal conference call instance 202. Call agent 502 also maintains data, such as user contact information, media capabilities and signaling protocols, about individual user devices. In the illustrated example, the user devices use the session initiation protocol to communicate with call agent 502. However, the subject matter described herein is not limited to using SIP. Any suitable signaling protocol, including SS7 H.323, SS7 over IP, or other signaling protocol may be used without departing from the scope of the subject matter described herein.

Soft bridge 500 and call agent 502 may be located on the same computing platform or on different computing platforms. In one exemplary implementation, soft bridge 500 is implemented on an Intel® server platform running a VxWorks® operating system and call agent 502 is implemented on a SUN® platform executing a Solaris® operating system. Soft bridge 500 and call agent 502 may communicate with each other via commands, referred to as simple device control protocol (SDCP) commands.

Exemplary SDCP commands that may be exchanged between soft bridge 500 and call agent 502 to establish and control features of a personal conference call include:

SB_Add—adds a user to a personal conference call

SB_Del—deletes a user from the personal conference call

SB_Modify—changes a parameter of a personal conference call, such as volume or directionality SB_Volume—adjusts volume of one conference member to another conference member SB_Config—controls initial parameters of a personal conference call, such as packetization size or number of participants SB_Audit—requests data about an ongoing personal conference call SB_Add_Mirror—adds a mirror of a personal conference call instance As stated above, in delivering multiple media streams to a conference owner, it is preferable that only the conference owner be able to adjust volume levels, since non-owner members may not be aware that other non-owner members are present or that a personal conference call is the mechanism used to deliver each media stream to a conference owner. Table 2 shown below illustrates and example of a volume table that may be maintained by each member of a personal conference with one owner and three non-owners.

TABLE 2

Volume Table for Personal Conference

| O1 | M1 | M2 | M2 |
|---|---|---|---|
| M1, +3 dB | O1, +2 dB | O1, −4 dB | O1, +5 dB |
| M2, 0 dB | *M2, 0 dB | *M1, 0 dB | *M1, 0 dB |
| M3, −1 dmB | *M3, 0 dB | *M3, 0 dB | *M2, 0 dB |

As illustrated in Table 2, each non-owner member (M1-M3) includes a zero dB volume adjustment for other non-owner members. In addition, the asterisks in Table 2 indicate that the volume adjustments are not modifiable by non-owner members. The entries without asterisks may be modifiable. For example, owner O1 can selectively modify the volumes of incoming media streams from members M1-M3 and selectively modify O1's outgoing volumes of media to M1-M3.

In the illustrated example, soft bridge 500 maintains personal conference call instance 202. Personal conference call instance 202 stores data about media connections 207, 209, 212, 214, and 216. In the illustrated example, personal conference call instance 202 stores a call table 504 which contains call IDs for each of the media connections and corresponding data structures for each call. The data structure for call A, which corresponds to the connection with conference owner 200, is shown as an example. In the illustrated example, per-call data structure 506 includes the IP address and port of conference owner 200 to which media packets should be sent. Volume levels for each call that is mixed and provided to conference owner 200 are also include in data structure 506. These volume levels are listed in data structure 506 as $V_B$, $V_C$, and $V_D$. Data structure 506 also includes a direction indicator for the call. The direction indicator indicates whether the call is send only, receive only, send and receive, or not send and not receive. In one implementation, the direction indicator may be used to selectively mute non-owner members in a personal conference. Table 3 shown below illustrates exemplary values that may be used for the direction indicator:

TABLE 3

Values for Direction Indicator

| Send | Receive | Direction |
|---|---|---|
| 0 | 0 | Soft bridge will not send or receive packets for this member |
| 0 | 1 | Soft bridge will accept packets from this member for mixing |
| 1 | 0 | Soft bridge will send mixed packets to this member |
| 1 | 1 | Soft bridge will send mixed packets to this member and accept packets from this member for mixing |

Similar data structures may be maintained for each of the remaining calls corresponding to the other media connections.

Call agent 502 includes phone instances 508 that store user contact and protocol information for contacting user terminals corresponding to call terminations 200, 204, 206, 208, and 210. Call agent 502 also includes protocol agents 510. Protocol agents 510 implement the protocol specified by phone instances 508 for performing call signaling to establish calls with each user terminal.

Although FIG. 5 illustrates soft bridge 500 and call agent 502 as being implemented on separate platforms, the subject matter described herein is not limited to such an implementation. In an alternate implementation, soft bridge 500 and call agent 502 may be implemented on a single hardware platform without departing from the scope of the subject matter described herein.

Figure 6:
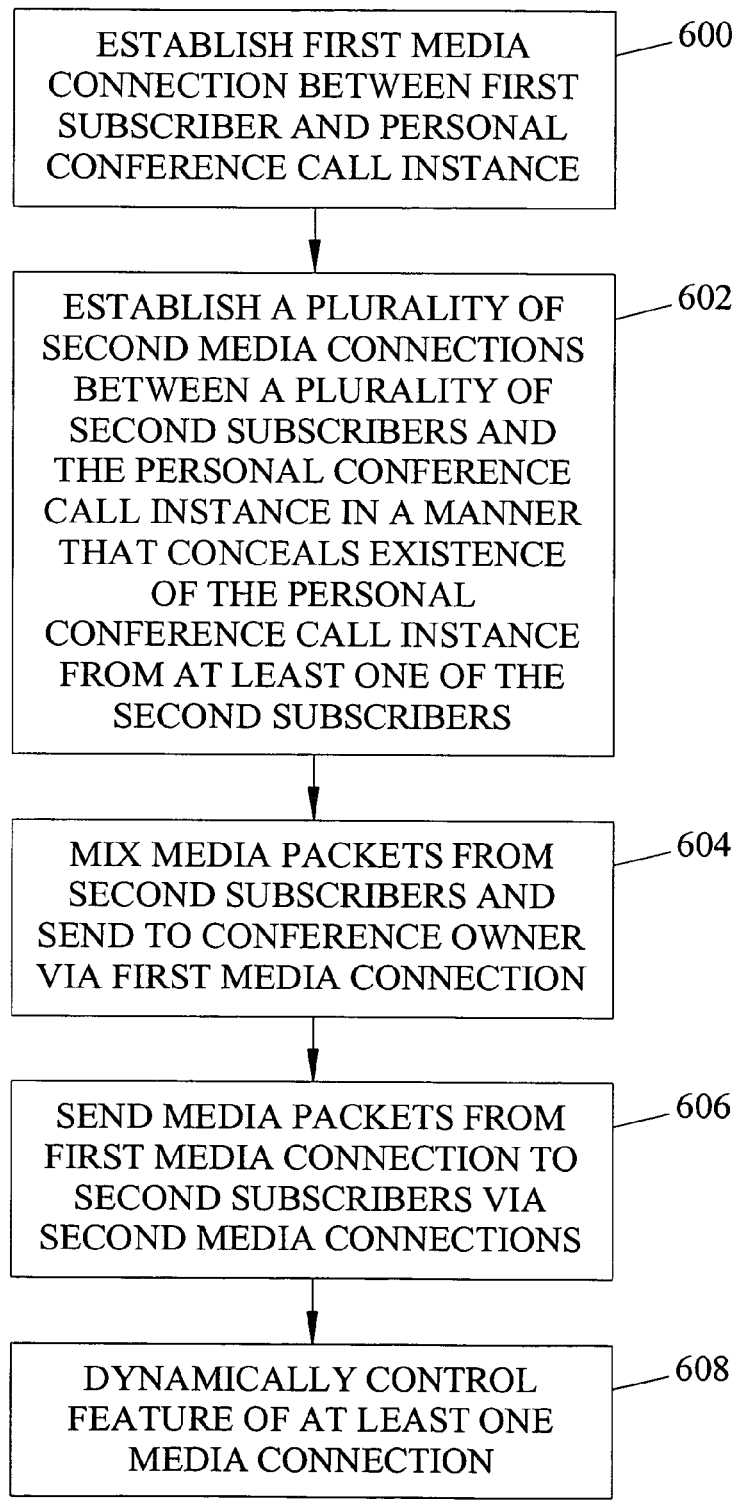
FIG. 6 is a flow chart illustrating exemplary steps for using a personal conference to dynamically control at least on feature of a media stream with a telephony device according to an embodiment of the subject matter described herein.

FIG. 6 is a flow chart illustrating exemplary steps for using a personal conference to privately establish and control features of multiple media connections with a telephony device according to an embodiment of the subject matter described herein. Referring to FIG. 6, in step 600, a first media connection is established between the owner and a personal conference call instance. The owner may be connected to the personal conference instance using a telephony device, such as a PSTN phone. In step 602, a plurality of second media connections is established between a plurality of second users and the personal conference call instance. The second media connections are established in a manner that conceals the existence of the personal conference call instance from at least one of the second users. For example, in one implementation, the personal conference may be established by having each participant other than the conference owner dial the directory number of the conference owner. The directory number of the conference owner may correspond to a phone instance 508 maintained for the conference owner by call agent 502. The call instance may include instructions for connecting each user that dials the directory number of the conference owner to personal conference call instance 202. Thus, each user may believe that he or she is dialing the conference owner, when he or she is actually dialing a number corresponding to personal conference call instance 202, which is configured to mix and send media packets to the conference owner.

In an alternate implementation, the personal conference call may be established by having call agent 502 dial the directory number of each user that is to be connected to the personal conference call. In such an implementation, protocol agents 510 may perform signaling functions for connecting each user to personal conference call instance 202. The signaling messages may include a calling party number corresponding to conference owner 200 so that any user with caller ID capabilities will think that the call is from conference owner 200, rather than conference call instance 202. Call agent 502 may instruct personal conference call instance 202 to add each participant to the conference call using the appropriate SDCP commands.

In step 604, media packets from the second users are mixed and sent to the owner via the first media connection. In step 606, media packets from the owner or first user are sent to the second users via the second media connections. In step 608, the personal conference call instance is controlled dynamically. For example, the conference owner may dynamically control volume, directionality, or muting of any of the media connections. Dynamically controlling an aspect of the personal conference call instance may include having the owner send a command to call agent 502 via any suitable means. For example, the owner may send a command via the owner's handset or via a computer terminal separate from the owner's handset to adjust the volume of one of the media connections associated with the personal conference call instance. In an implementation in which the owner uses his or her handset to dynamically control a feature of the conference, two methods for controlling the features may be provided—one using star codes and the other using other buttons on the owner's handset. Each of these control examples will now be described in detail.

In an implementation in which the owner uses star codes, the owner may identify the non-owner user whose audio stream is being modified using an identification number corresponding to the non-owner user. Each non-owner user may be given an identifier in the conference such that the owner can reference the audio stream to or from that user for feature invocation. Once the particular audio stream is selected, call agent 502 may be programmed to recognize star codes so that the owner can change the directionality of the media stream, modify the volume of the media stream, or mute the media stream. Using star codes will allow the conference owner to control features of the personal conference call using any type of phone. However, such an implementation requires that the user remember the star codes in order to modify the calls.

In an implementation that uses other phone buttons to dynamically control personal conference call features, the phone may include an LCD screen that displays indicators of each of the multiple calls that make up the personal conference call. The LCD screen may also include a menu of buttons for accessing each call. Once a call is selected, the owner has the option of using star codes to modify call properties using keys to navigate menus to control each call. For example, once a call is selected, the LCD screen may allow a user to dynamically adjust the volume level of a call using arrow keys provided on the keypad.

In an implementation in which a computer terminal separate from the conference owner's phone is used to control features of a personal conference call, the computer terminal may include a command line interface or a GUI interface that allows the owner to select and control individual conference features. In one example, a GUI interface may provide information relating to calls connected to the personal conference call instance. The information may be published to the computer terminal on which the GUI interface is running using application programming interface (API) commands. The owner can modify call properties by selecting one of the calls and a required action. The selection may be performed using a keyboard, mouse, or other input device connected to the computer terminal. The request will be translated into an API command and transmitted to the call agent.

In response to receiving a feature control command from conference owner 200, call agent 502 may send the appropriate SDCP command to soft bridge 500. Soft bridge 500 may adjust the appropriate value in the per-conference call data table 506 and adjust the volume level on the corresponding RTP media stream.

Figure 7:
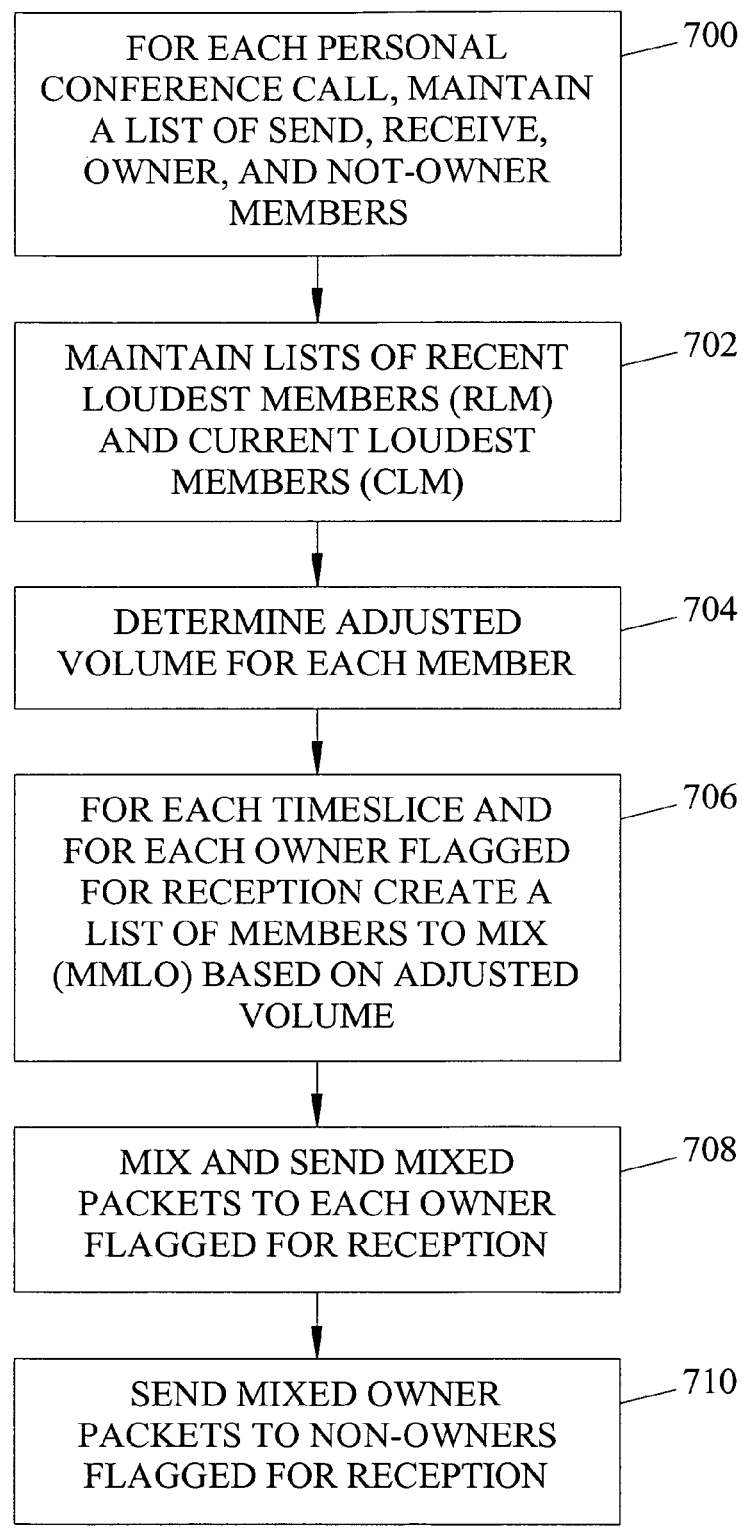
FIG. 7 is a flow chart illustrating exemplary steps for mixing media packets to be delivered to a telephony user using a personal conference according to an embodiment of the subject matter described herein.

FIG. 7 is a flow chart illustrating exemplary steps for mixing media streams in a personal conference call according to an embodiment of the subject matter described herein. Referring to FIG. 7, in step 700, for each personal conference call, a list of send, receive, owner, and not owner members is maintained. When a conference member is added to the personal conference call, the member is added to the appropriate list. Each personal conference call may have a number of current loudest members (NCLM) and recent loudest members (NRLM) to mix. That is, when a personal conference call reaches a certain size, not all of the members are mixed because the resulting audio stream would be incoherent. Accordingly, in step 702, lists of recent loudest members (RLM) and current loudest members (CLM) are maintained.

In step 704, the adjusted volume is determined for each member. As illustrated in FIG. 4, personal conference call instance 202 may maintain separate volume tables containing volume adjustment levels in decibels for each connection. The adjusted volume may be determined by computing the average energy of each received packet and multiplying the average energy times the volume adjustment level.

In step 706, for each time slice and for each conference owner that is flagged for packet reception, a list of members to mix is determined based on the adjusted volume. This step may include, for each conference member from which the conference is receiving packets:
  Compute the average energy of the received packet;
  Order energy values and store in a current loudest received list (CLRL);
  From the CLRL, move NCLM entries into the MML;
  From the RLM, move NRLM entries into the MML without adding any members moved from the CLRL; and
  Expire any old RLM entries and move the CLRL entries that were added to the MML into the RLM list.

In step 708, packets are mixed and sent to the conference owner or owners. In order to mix the packets to each owner, the following steps may be performed:
  For each member that is an owner and the send flag is set
    For each entry in the MML that does not equal the current member
      Add the adjusted volume level to the outgoing packet
        If the sum results in an overflow or underflow
          Adjust the volume level to either the min or max value.
    If at least one packet was added
      Send the mixed packet to the member's destination IP:Port and
        Ethernet address.

In step 710, mixed owner packets are sent to the non-owners that are flagged for reception. This step may be accomplished as follows:
  For each member that is not an owner and the send flag is set
    For each entry in the MML that the receive and owner flags are set
      Add the adjusted volume level to the outgoing packet.
        If the sum results in an overflow or underflow
          Adjust the volume level to the min or max value.
    If at least one packet was added
      Send the mixed packet to the member destination IP:Port and
        Ethernet address.

In the last "If" statement in the above-referenced algorithm, mixed packets are sent to other members who are also owners. This statement allows a personal conference to have multiple owners who receive mixed packets from non-owner members.

According to another aspect, the subject matter described herein may include pre-storing volume adjustment levels for different speech compression algorithms. For example, in one implementation, soft bridge 500 may not include a digital signal processor (DSP) for converting volume adjustments between different voice compression algorithms, such as G.711 μto pulse code modulation (PCM). Instead, soft bridge 500 may include a general-purpose microprocessor that performs volume adjustment as well as other personal conference functions. Since converting volume adjustments between different voice compression standards can involve floating point mathematics, it is desirable to reduce the number of these calculations that must be performed by the microprocessor of soft bridge 500. Accordingly, in one implementation of the subject matter described herein, volume adjustment tables may be precomputed and stored in memory of soft bridge 500.

Figure 8:
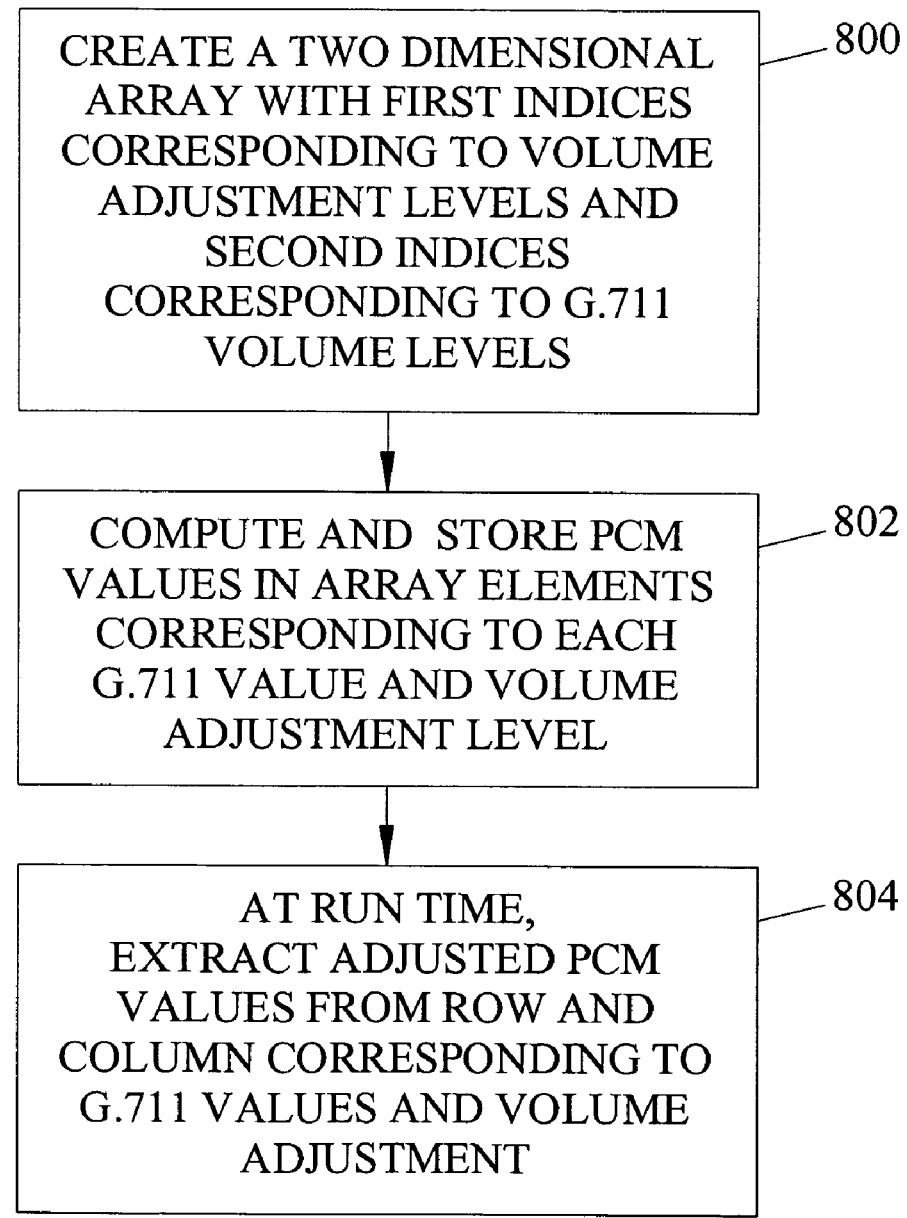
FIG. 8 is a flow chart illustrating an exemplary process for adjusting volume levels for different speech compression schemes used in delivering media packets to a telephony user using a personal conference call according to an embodiment of the subject matter described herein.
Figure 9:
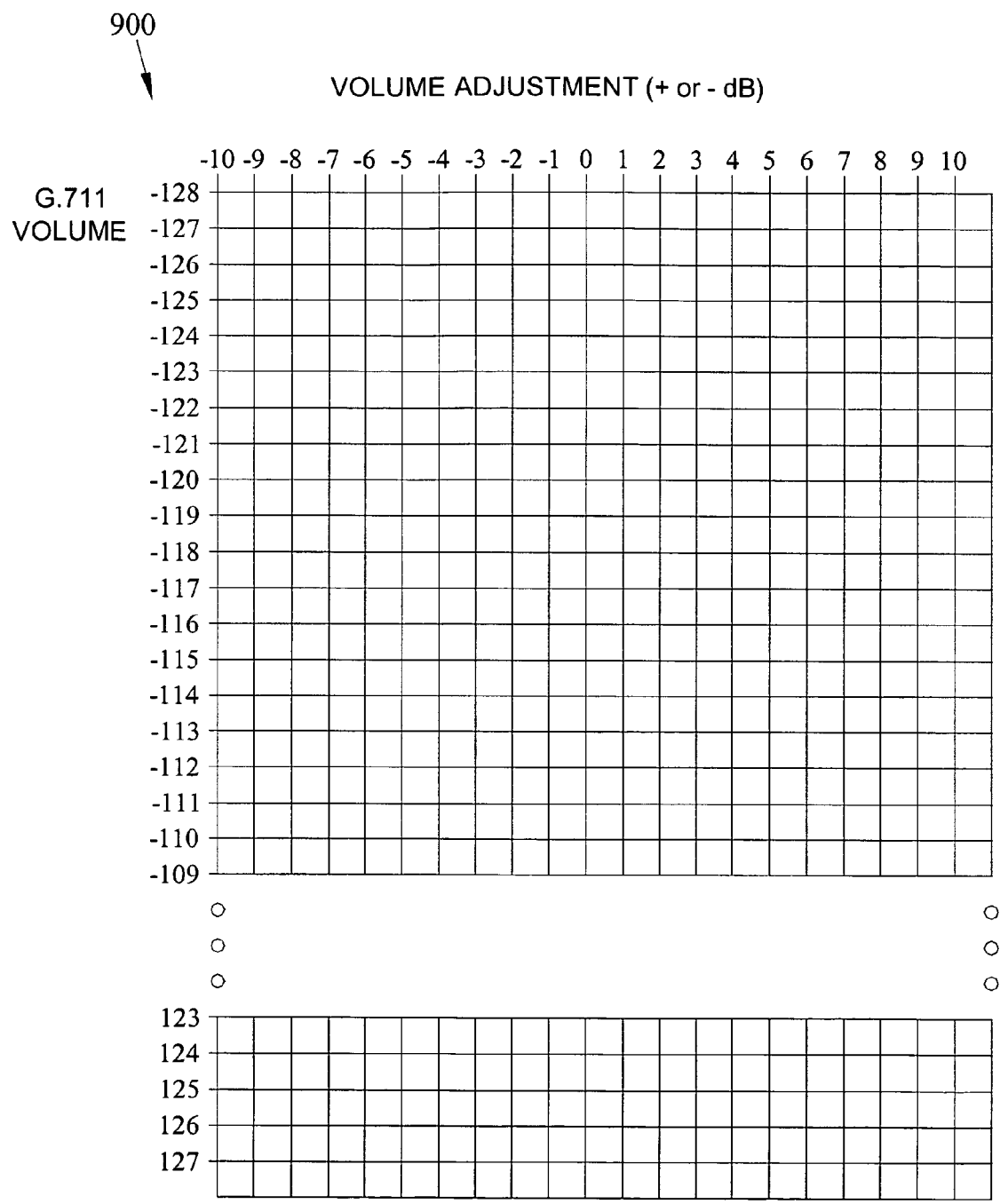
FIG. 9 is a schematic diagram illustrating an exemplary two-dimensional array used in performing volume adjustment according to FIG. 8.

FIG. 8 is a flow chart illustrating exemplary steps for precomputing and using volume adjustment levels according to an embodiment of the subject matter described herein. Referring to FIG. 8, in step 800, a two-dimensional array with first indices corresponding to volume adjustment levels and second indices corresponding to G.711 values is created. FIG. 9 illustrates an example of such an array. The indices may be reversed without departing from the scope of the subject matter described herein. In FIG. 9, a two dimensional array 900 includes twenty-one columns for volume adjustment levels ranging from −10 dB to 10 dB. Array 900 includes 256 rows, ranging from −128 to 127, which correspond to the range of potential G.711 values.

Returning to FIG. 8, in step 802, PCM values are computed and stored in array elements corresponding to each G.711 value and volume adjustment level. For example, for G.711 value of 4, PCM values may be computed for volume adjustments ranging from −10 dB to 10 dB. The computed PCM values may be stored in the appropriate elements of array 900. This process is repeated for each G.711 value and volume adjustment level.

In step 804, at run time, in order to determine an adjusted PCM volume level, the G.711 value and the volume adjustment are used to extract the PCM value from array 900. For example, if the G.711 value is eight and it is desirable to adjust the element by +3 dB, then array 900 will be accessed at array element [−128][13] to extract the appropriate PCM value. By precomputing and storing volume adjustment levels, the subject matter described herein allows dynamic volume adjustment without requiring dedicated DSP resources to perform the volume adjustment.

Figure 10:
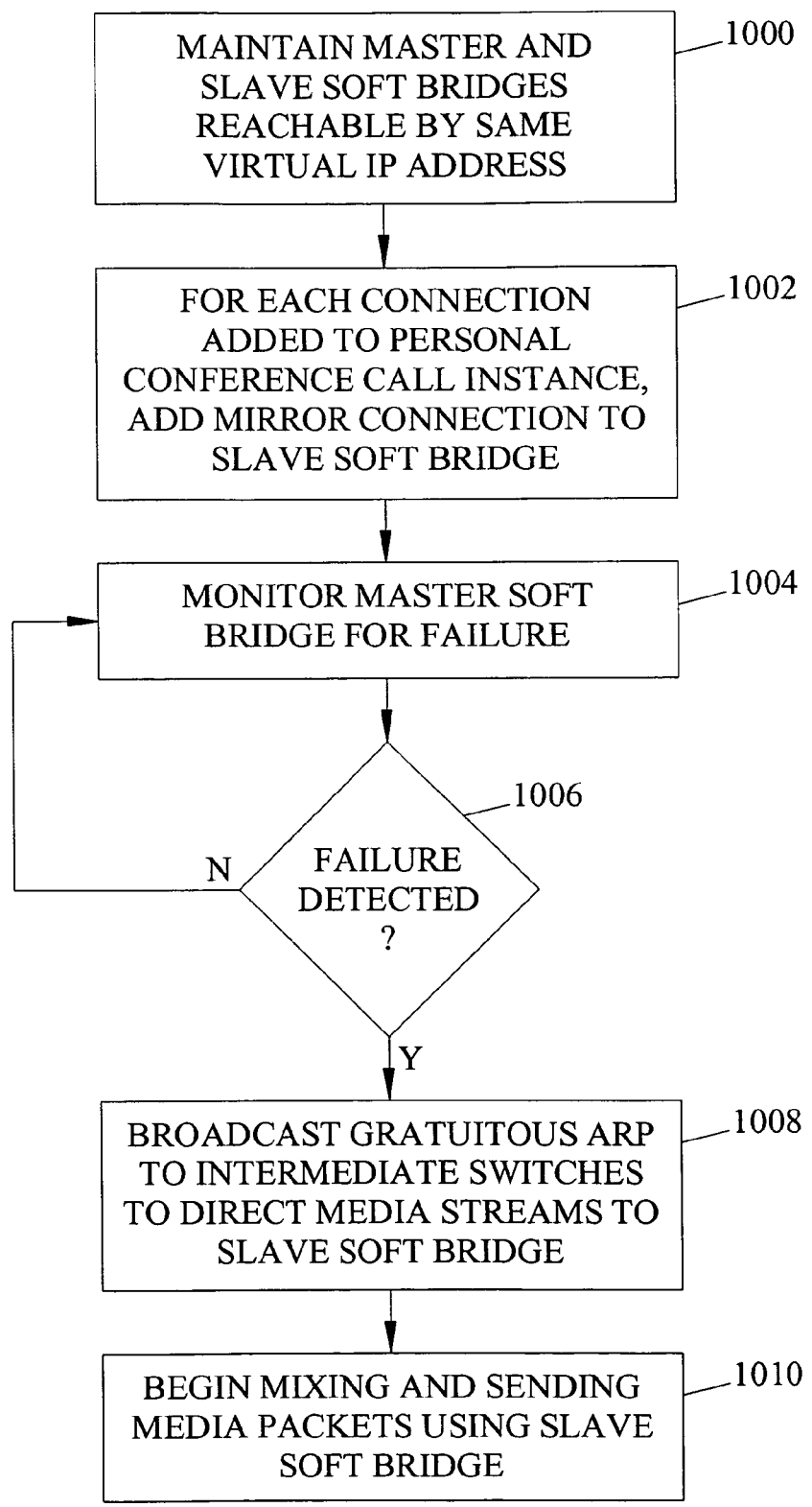
FIG. 10 is a flow chart illustrating exemplary steps for mirroring a personal conference call and switching over to the mirrored personal conference call in response to failure of a primary personal conference call according to an embodiment of the subject matter described herein.

According to another aspect, the subject matter described herein includes mirroring a personal conference call from a master soft bridge to a slave soft bridge so that the personal conference can be switched over without dropping calls and with minimal delay. FIG. 10 is a flow chart illustrating an exemplary process for mirroring a personal conference call to n slave soft bridges where n is an integer of at least one, and switching to one of the n slaves soft bridge in response to failure of the master soft bridge according to an embodiment of the subject matter described herein. Referring to FIG. 10, in step 1000, master and slave soft bridges reachable by the same virtual IP address are maintained. In step 1002, for each connection added to a personal conference call instance, a mirror connection is added to the slave soft bridge. In one exemplary implementation, connections may be added using commands transmitted from the call agent to the master and slave soft bridges.

Figure 11:
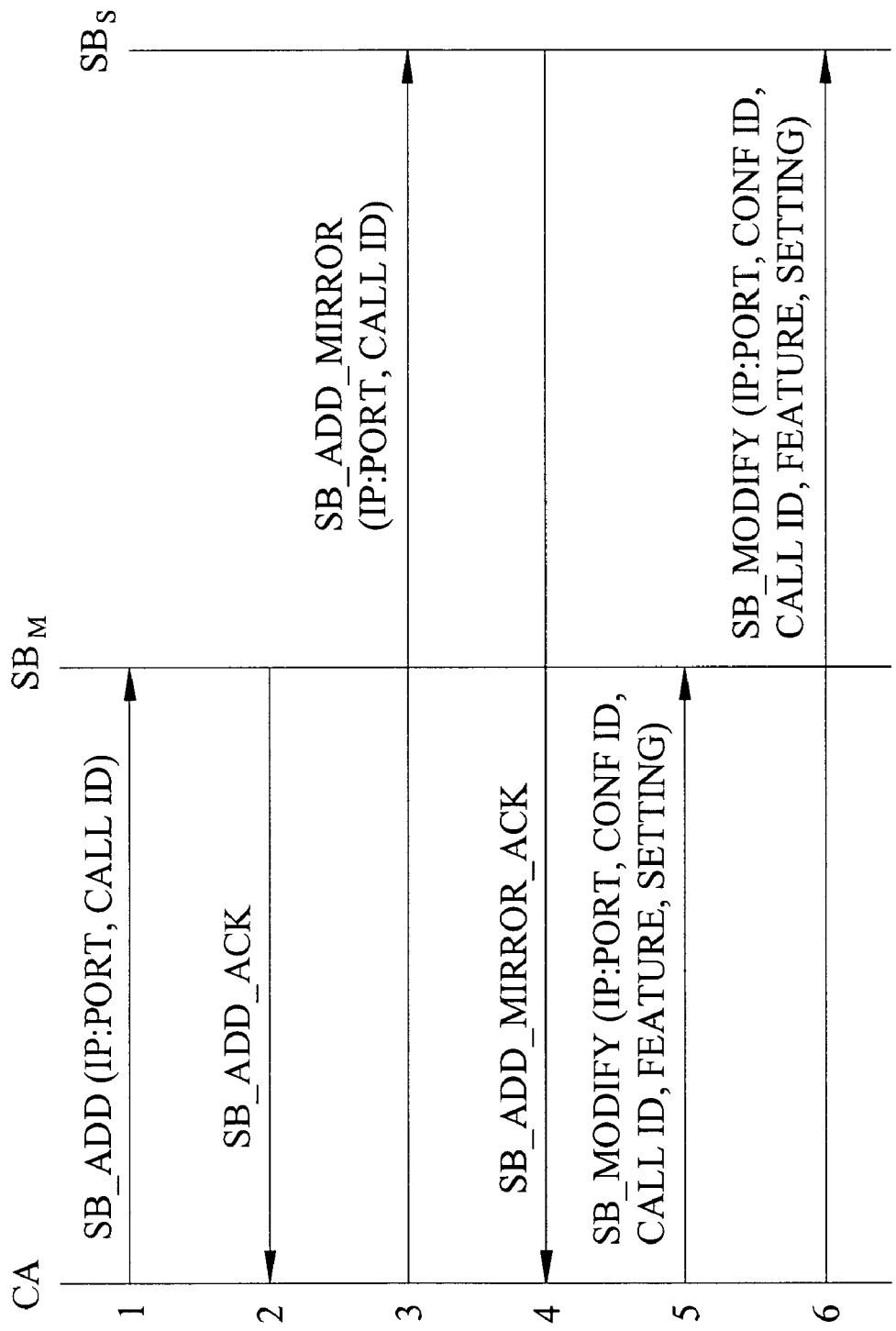
FIG. 11 is a message flow diagram illustrating an example of messages that may be exchanged between the call agent and the master enslaved soft bridges to establish a connection with the master soft bridge and mirror a connection with the slave soft bridge.

FIG. 11 is a message flow diagram illustrating an example of messages that may be exchanged between the call agent and the master and slave soft bridge to establish a connection with a master soft bridge and a mirror connection with the slave soft bridge. Referring to FIG. 11, in line 1 of the message flow diagram, the call agent sends an add command to the master soft bridge to add a connection to the master soft bridge. The add command includes the IP address, port, and call ID for the user terminal being added. In line 2 of the message flow diagram, the master soft bridge acknowledges the add command. The acknowledgement may include the virtual IP address and port the soft bridge allocated to the user because the soft bridge may support N virtual IP addresses over P physical network interfaces, where N and P are both integers.

In line 3 of the message flow diagram, the call agent sends an add mirror command to the slave soft bridge to instruct the slave soft bridge to add a connection corresponding to the IP address, port, and call ID specified in the SB add command in line 1. In response to this request, the slave soft bridge preferably reserves resources for processing the call but does not send or receive any media streams relating to the call. In line 4 of the message flow diagram, the slave soft bridge acknowledges the soft bridge add mirror acknowledgement command. In lines 5 and 6 of the message flow diagram, the call agent sends a modify command to the master and slave soft bridges. The modify command includes the virtual IP address of the master and slave soft bridges, the conference ID, the call ID of the call being modified, the feature being modified, and the setting. The modify command is sent to both soft bridges so that the features of the personal conference instance on the slave soft bridge will be synchronized with those of the personal conference instance of the master soft bridge.

Returning to FIG. 10, in steps 1004 and 1006, the master soft bridge is monitored for a failure. Such monitoring may be accomplished in any suitable manner, such as periodically requesting operational status from the master soft bridge or having the master soft bridge periodically send heartbeat messages to the slave soft bridge. If no failure is detected, the monitoring continues.

However, if a failure is detected, control proceeds to step 1008 where the slave soft bridge broadcasts a gratuitous address resolution protocol (ARP) message to intermediate switches and routers to direct the media streams to the slave soft bridge. The gratuitous ARP message will update intermediate switches and routers to start sending media packets to the slave soft bridge on the port on which the gratuitous ARP message was received. In step 1010, the slave soft bridge begins mixing and sending media packets. Thus, by maintaining a mirror soft bridge and switching to the mirror soft bridge in response to failure of the master soft bridge, personal conference can be maintained without dropping calls.

The subject matter described herein is not limited to mirroring a personal conference. For example, the methods illustrated in FIGS. 10 and 11 may be used to mirror any type of multi-party communication, including ad-hoc conferences where all participants are aware of each other.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for using a personal conference to privately establish and control media connections with a telephony device, the method comprising:

(a) establishing a first media connection between a first user and a personal conference call instance, wherein the first user is connected to the personal conference instance using a telephony device;

(b) establishing a plurality of second media connections between a plurality of second users and the personal conference call instance in a manner that conceals existence of the personal conference call instance from at least one of the second users so that the at least one second user is unaware that he or she is participating in a conference call and such that the at least one second user believes that he or she is communicating exclusively with the first user;

(c) mixing media packets from the second users and delivering the mixed media packets to the first user;

(d) sending media packets from the first user to the at least one second user;

(e) providing at least one feature of the personal conference call instance that that is controllable exclusively by the first user; and (f) dynamically controlling, exclusively by the first user, the at least one feature of the personal conference call instance.

2. The method of claim 1 wherein establishing the first media connection includes establishing a real time transmission protocol (RTP) stream.

3. The method of claim 1 wherein establishing a plurality of second media connections in a manner that conceals existence of the personal conference call instance from at least one of the second users includes routing calls placed to a directory number of the first user to the personal conference call instance.

4. The method of claim 1 wherein establishing a plurality of second media connections in a manner that conceals existence of the personal conference call instance from at least one of the second users includes dialing each of the second users using a directory calling party number corresponding to the first user.

5. The method of claim 1 wherein establishing a plurality of second media connections includes establishing a plurality of real time transport protocol (RTP) media connections.

6. The method of claim 1 wherein mixing media packets from the second users includes mixing a number of media packets from the second users to be delivered to the first user and wherein the number of media packets to be mixed is configurable by the first user.

7. The method of claim 1 wherein dynamically controlling at least one aspect of the personal conference call instance includes controlling volume of at least one of the media connections.

8. The method of claim 1 wherein dynamically controlling at least one aspect of the personal conference call includes dynamically controlling directionality of at least one of the media connections.

9. The method of claim 1 wherein dynamically controlling at least one aspect of the personal conference call includes:

(a) receiving, at a call agent, a feature control command from the first user;

(b) transmitting the feature control command to a soft bridge hosting the personal conference call instance; and (c) at the soft bridge, controlling a feature of the conference call instance based on the feature control command.

10. The method of claim 1 wherein controlling at least one aspect of the personal conference call instance includes precomputing and storing volume adjustment levels and using the precomputed volume adjustment levels to adjust volume of at least one of the media connections.

11. The method of claim 1 wherein performing steps (d)-(f) includes performing steps (d)-(f) using a master soft bridge and wherein the method further comprises:

(a) mirroring each media connection added to the personal conference to a slave soft bridge;

(b) monitoring operational status of the master soft bridge; and (c) in response to detecting failure of the master soft bridge, switching media connections to the slave soft bridge.

12. The method of claim 11 wherein switching the media connections to the slave soft bridge includes sending a gratuitous address resolution protocol (ARP) message to switches connected to the slave soft bridge to direct the media packets to the slave soft bridge.

13. The method of claim 1 wherein the media connections comprise at least one audio connection.

14. The method of claim 1 wherein the media connections include at least one video connection.

15. The method of claim 1 wherein the telephony device comprises a general purpose PSTN telephone.

16. A system for using a personal conference to privately establish and control media connections with a telephony device, the system comprising:

(a) a soft bridge for maintaining a personal conference call instance and for establishing media connections between users and the personal conference call instance; and (b) a call agent for performing signaling functions for establishing a first media connection between a first user and the personal conference call instance and for establishing a plurality of second media connections between a plurality of second users and the personal conference call instance in a manner that conceals existence of the personal conference call instance from at least one of the second users so that the at least one second user is unaware that he or she is participating in a conference call and such that the at least one second user believes that he or she is communicating exclusively with the first user and for providing at least one feature of the personal conference call instance that is controllable exclusively by the first user and for dynamically controlling, exclusively by the first user, the at least one feature of the personal conference call instance, wherein the first user is connected to the personal conference instance using a telephony device.

17. The system of claim 16 wherein the soft bridge is adapted to mix media packets from the second users and deliver the mixed media packets to the first user and to send media packets from the first user to the plurality of second users.

18. The system of claim 16 wherein, in establishing the plurality of second media connections in a manner that conceals existence of the personal conference call instance from at least one of the second users, the call agent is adapted to route calls placed to a directory number of the first user to the personal conference call instance.

19. The system of claim 16 wherein, in establishing the plurality of second media connections in a manner that conceals existence of the personal conference call instance from at least one of the second users, the call agent is adapted to dial the at least one second user using a calling party number corresponding to the first user.

20. The system of claim 17 wherein, in mixing the media packets from the second users, the soft bridge is adapted to mix a number of media packets from the second users to be delivered to the first user, the number being configurable by the first user.

21. The system of claim 16 wherein, in dynamically controlling at least one feature of the personal conference call instance, the call agent is adapted to control volume of at least one of the media connections.

22. The system of claim 16 wherein, in dynamically controlling at least one feature of the personal conference call instance, the call agent is adapted to control directionality of at least one of the media connections.

23. The system of claim 16 wherein, in dynamically controlling at least one feature of the personal conference call instance, the call agent is adapted to send commands to the soft bridge for controlling the at least one aspect.

24. The system of claim 23 wherein the at least one feature includes volume and wherein the soft bridge is adapted to store precomputed volume adjustment levels and to use the precomputed volume adjustment levels to adjust volume of at least one of the media connections in response to a command from the call agent.

25. The system of claim 16 wherein the soft bridge comprises a master soft bridge for maintaining the personal conference call instance and wherein the system further comprises a slave soft bridge for mirroring the personal conference call instance and for becoming the master soft bridge in response to failure of the slave soft bridge.

26. The system of claim 25 wherein, in response to detecting failure of the master soft bridge, the slave soft bridge is adapted to send a gratuitous address resolution protocol (ARP) message to switches connected to the slave soft bridge to direct the media packets to the slave soft bridge.

27. The system of claim 16 wherein the media connections include at least one audio connection.

28. The system of claim 16 wherein the media connections include at least one video connection.

29. The system of claim 16 wherein the telephony device comprises a general purpose PSTN telephone.

30. A computer program product comprising computer executable instructions embodied in a computer readable medium for performing steps comprising:
 (a) establishing a first media connection between a first user and a personal conference call instance, wherein the first user is connected to the personal conference instance using a telephony device;
 (b) establishing a plurality of second media connections between a plurality of second users and the personal conference call instance in a manner that conceals existence of the personal conference call instance from at least one of the second users so that the at least one second user is unaware that he or she is participating in a conference call and such that the at least one second user believes that he or she is communicating exclusively with the first user;
 (c) mixing media packets from the second users and delivering the mixed media packets to the first user;
 (d) sending media packets from the first user to the at least one second user;
 (e) providing at lease one feature that is controllable exclusively by the first user; and
 (f) dynamically controlling, exclusively by the first user, the at least one feature of the personal conference call instance.

31. The computer program product of claim 30 wherein establishing the first media connection includes establishing a real time transmission protocol (RTP) stream.

32. The computer program product of claim 30 wherein establishing a plurality of second media connections in a manner that conceals existence of the personal conference call instance from at least one of the second users includes routing calls placed to a directory number of the first user to the personal conference call instance.

33. The computer program product of claim 30 wherein establishing a plurality of second media connections in a manner that conceals existence of the personal conference call instance from at least one of the second users includes dialing each of the second users using a directory calling party number corresponding to the first user.

34. The computer program product of claim 30 wherein establishing a plurality of second media connections includes establishing a plurality of real time transport protocol (RTP) media connections.

35. The computer program product of claim 30 wherein mixing media packets from the second users includes mixing a number of media packets from the second users to be delivered to the first user and wherein the number of media packets to be mixed is configurable by the first user.

36. The computer program product of claim 30 wherein dynamically controlling at least one aspect of the personal conference call instance includes controlling volume of at least one of the media connections.

37. The computer program product of claim 30 wherein dynamically controlling at least one aspect of the personal conference call includes dynamically controlling directionality of at least one of the media connections.

38. The computer program product of claim 30 wherein dynamically controlling at least one aspect of the personal conference call includes:
 (a) receiving, at a call agent, a feature control command from the first user;
 (b) transmitting the feature control command to a soft bridge hosting the personal conference call instance; and
 (c) at the soft bridge, controlling a feature of the conference call instance based on the feature control command.

39. The computer program product of claim 30 wherein controlling at least one aspect of the personal conference call instance includes precomputing and storing volume adjustment levels and using the precomputed volume adjustment levels to adjust volume of at least one of the media connections.

40. The computer program product of claim 30 wherein performing steps (d)-(f) includes performing steps (d)-(f) using a master soft bridge and wherein the method further comprises:
 (a) mirroring each media connection added to the personal conference to a slave soft bridge;
 (b) monitoring operational status of the master soft bridge; and
 (c) in response to detecting failure of the master soft bridge, switching media connections to the slave soft bridge.

41. The computer program product of claim 40 wherein switching the media connections to the slave soft bridge includes sending a gratuitous address resolution protocol (ARP) message to switches connected to the slave soft bridge to direct the media packets to the slave soft bridge.

42. The computer program product of claim 30 wherein the media connections include at least one audio connection.

43. The computer program product of claim 30 wherein the media connections include at least one video connection.

44. The computer program product of claim 30 wherein the telephony device comprises a general-purpose PSTN telephone.

* * * * *